(12) United States Patent
Kim et al.

(10) Patent No.: US 11,102,598 B1
(45) Date of Patent: Aug. 24, 2021

(54) PERSONAL AIR VEHICLE AND CONTROL METHOD THEREOF

(71) Applicants: Hyundai Motor Company, Seoul (KR); Kia Motors Corporation, Seoul (KR)

(72) Inventors: Youngbeom Kim, Gyeonggi-do (KR); Yonghwan Hwang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/027,841

(22) Filed: Sep. 22, 2020

(30) Foreign Application Priority Data

Feb. 10, 2020 (KR) .................. 10-2020-0015517

(51) Int. Cl.
| | |
|---|---|
| H04R 29/00 | (2006.01) |
| B64D 11/00 | (2006.01) |
| B64D 45/00 | (2006.01) |
| H04R 1/02 | (2006.01) |
| H04R 9/06 | (2006.01) |
| G10L 25/51 | (2013.01) |
| G08B 3/10 | (2006.01) |
| G01K 3/00 | (2006.01) |
| G01L 13/00 | (2006.01) |
| H04R 3/00 | (2006.01) |
| B64D 27/02 | (2006.01) |
| H04B 1/38 | (2015.01) |

(52) U.S. Cl.
CPC ....... *H04R 29/001* (2013.01); *B64D 11/0015* (2013.01); *B64D 45/00* (2013.01); *G01K 3/005* (2013.01); *G01L 13/00* (2013.01); *G08B 3/10* (2013.01); *G10L 25/51* (2013.01); *H04R 1/028* (2013.01); *H04R 3/00* (2013.01); *H04R 9/06* (2013.01); *B64D 27/02* (2013.01); *H04B 1/38* (2013.01); *H04R 2430/01* (2013.01); *H04R 2499/13* (2013.01)

(58) Field of Classification Search
CPC ........ H04R 29/001; H04R 1/028; H04R 3/00; H04R 9/06; H04R 2430/01; H04R 2499/13; B64D 11/0015; B64D 45/00; B64D 27/02; G10K 3/005; G01L 13/00; G01L 25/51; G08B 3/10; H04B 1/38
See application file for complete search history.

(56) References Cited

U.S. PATENT DOCUMENTS

| | | | |
|---|---|---|---|
| 2019/0098403 A1* | 3/2019 | Osterneck | H04R 3/08 |
| 2021/0107643 A1* | 4/2021 | Nagai | B64D 25/00 |

* cited by examiner

*Primary Examiner* — Andrew L Sniezek
(74) *Attorney, Agent, or Firm* — Mintz Levin Cohn Ferris Glovsky and Popeo, P.C.; Peter F. Corless

(57) ABSTRACT

A personal air vehicle (PAV) and a control method thereof are provided for compensating for distortion in a speaker due to changes in altitude. The PAV provides communication through a speaker in an emergency. In particular, the PAV includes an air pressure sensor that is configured to sense external air pressure and a propulsion device that is configured to supply propulsion for flight. A speaker is provided and includes an enclosure having a preset internal air pressure. A controller is configured to adjust an acoustic signal supplied to the speaker based on a difference value between the external air pressure and the internal air pressure changing according to altitude.

18 Claims, 12 Drawing Sheets

<BEFORE GAIN ADJUSTMENT>

<AFTER GAIN ADJUSTMENT>

PERSONAL AIR VEHICLE AND CONTROL METHOD THEREOF

CROSS-REFERENCE TO RELATED APPLICATION

This application is based on and claims priority under 35 U.S.C. § 119 to Korean Patent Application No. 10-2020-0015517, filed on Feb. 10, 2020, the disclosure of which is incorporated herein by reference.

BACKGROUND

1. Technical Field

The disclosure relates to a personal air vehicle (PAV), and more particularly, a PAV that includes a speaker and a control method thereof.

2. Description of the Related Art

Recently, personal air vehicles (PAVs) have been actively developed. The personal air vehicle is a type of vehicle that moves without a runway since it is capable of taking off and landing vertically, and is a personal vehicle capable of moving using the transportation network in the sky. The personal air vehicle may include an indoor speaker for providing acoustic information to a passenger and an outdoor speaker for providing acoustic information to the outside. In the personal air vehicle, altitude may vary based on the flight, and distortion in the speaker may occur due to changes in air pressure and temperature according to altitude. In addition, the personal air vehicle includes a propulsion device such as a propeller, and turbulence noise in the propulsion device may cause distortion in the speaker.

SUMMARY

Therefore, the present invention provides a personal air vehicle (PAV) and a control method thereof that compensate for distortion in a speaker due to changes in altitude. In addition, the present disclosure provides a personal air vehicle that provides communication via a speaker in an emergency and a control method thereof.

In accordance with one aspect of the disclosure, a personal air vehicle (PAV) may include: an air pressure sensor configured to sense external air pressure; a propulsion device configured to supply propulsion for flight; a speaker having an enclosure having a preset internal air pressure; and a controller configured to adjust an acoustic signal supplied to the speaker based on a difference value between the external air pressure and the internal air pressure changing according to altitude.

The controller may be configured to adjust the current value of the acoustic signal to cancel the bias corresponding to the distance that the voice coil of the speaker moved in the opposite direction of the enclosure according to the difference value. The personal air vehicle may further include: a temperature sensor configured to sense the external temperature, and the controller may be configured to adjust the acoustic signal based on the external temperature to compensate for the movement of the voice coil of the speaker changing according to temperature.

The personal air vehicle may further include: a microphone configured to collect external noise, and the controller may be configured to adjust the acoustic signal to amplify the frequency region that corresponds to the external noise generated from the propulsion device. Additionally, the personal air vehicle may include: a transceiver configured to communicate with an external device, and the controller may be configured to operate the speaker to output an emergency sound having a preset frequency and a preset size when there is an abnormality in the transceiver.

The emergency sound may be an acoustic signal not adjusted based on the difference value between the external air pressure and the internal air pressure. In response to receiving an emergency sound from an external personal air vehicle through the microphone, the controller may be configured to determine an altitude of the external personal air vehicle based on a bias in the emergency sound, determine the distance to the external personal air vehicle based on the size of the emergency sound and determine the location of the external personal air vehicle based on the altitude of the external personal air vehicle and the distance to the external personal air vehicle.

The controller may be configured to operate the transceiver to transmit the location of the external personal air vehicle to the rescue center server. The personal air vehicle may further include a horn provided on the front surface of the speaker, and the horn may extend beyond the radius of the propeller of the propulsion device.

In accordance with one aspect of the disclosure, a control method of a personal air vehicle (PAV) including an air pressure sensor configured to sense external air pressure, a propulsion device configured to supply propulsion for flight, a speaker having an enclosure having a preset internal air pressure, the method may include: adjusting an acoustic signal supplied to the speaker based on a difference value between the external air pressure and the internal air pressure changing according to altitude.

The adjusting the acoustic signal supplied to the speaker may include: adjusting the current value of the acoustic signal to cancel the bias corresponding to the distance that the voice coil of the speaker moved in the opposite direction of the enclosure according to the difference value. The personal air vehicle may further include a temperature sensor configured to sense the external temperature, and the method may include: adjusting the acoustic signal based on the external temperature to compensate for the movement of the voice coil of the speaker changing according to temperature.

The personal air vehicle may further include a microphone configured to collect external noise, and the method may further include: adjusting the acoustic signal to amplify the frequency region corresponding to the external noise generated from the propulsion device. Additionally, the personal air vehicle may include a transceiver configured to communicate with an external device, and the method may include: operating the speaker to output an emergency sound having a preset frequency and a preset size in response to detecting an abnormality in the transceiver. The emergency sound may be an acoustic signal not adjusted based on the difference value between the external air pressure and the internal air pressure.

The control method may further include: in response to receiving an emergency sound from an external personal air vehicle through the microphone, determining an altitude of the external personal air vehicle based on a bias in the emergency sound; determining the distance to the external personal air vehicle based on the size of the emergency sound; and determining the location of the external personal air vehicle based on the altitude of the external personal air vehicle and the distance to the external personal air vehicle. Additionally, the control method may include: operating the transceiver to transmit the location of the external personal air vehicle to the rescue center server. The personal air vehicle may further include a horn provided on the front surface of the speaker, and the horn may extend beyond the radius of the propeller of the propulsion device.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
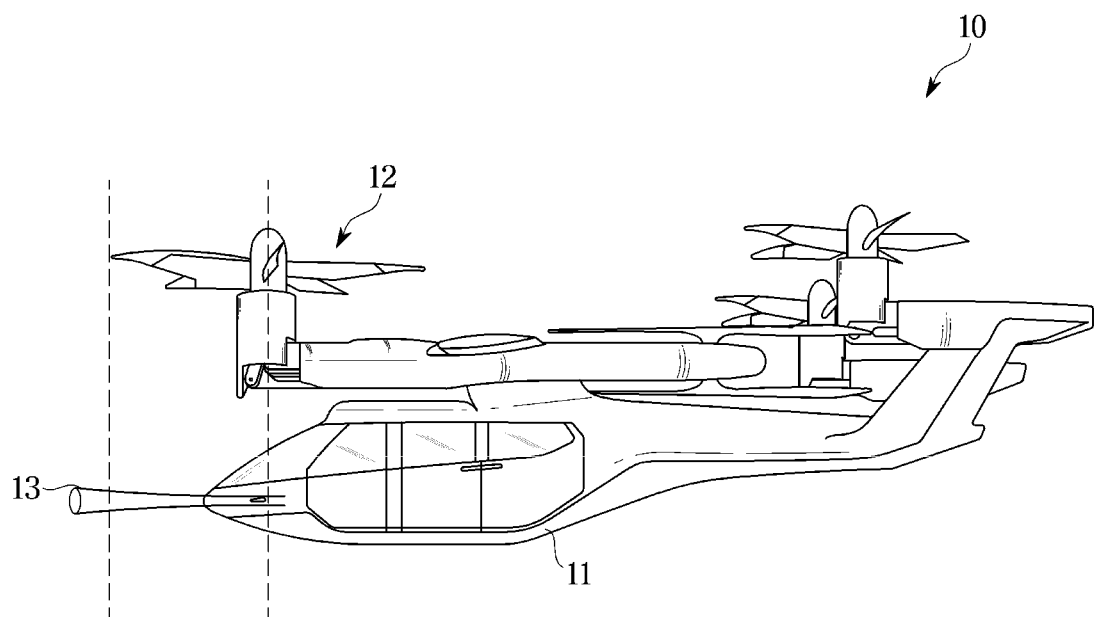
FIG. 1 is an external view of a personal air vehicle according to an exemplary embodiment of the present disclosure.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of exemplary embodiments of the disclosure will be described, and description of what are commonly known in the art or what overlap each other in the exemplary embodiments will be omitted. It will be understood that when an element is referred to as being "connected" to another element, it can be directly or indirectly connected to the other element, wherein the indirect connection includes "connection" via a wireless communication network.

Also, when a part "includes" or "comprises" an element, unless there is a particular description contrary thereto, the part may further include other elements, not excluding the other elements. As used herein, the singular forms "a," "an" and "the" are intended to include the plural forms as well, unless the context clearly indicates otherwise.

As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor. An identification code is used for the convenience of the description but is not intended to illustrate the order of each step. Each of the steps may be implemented in an order different from the illustrated order unless the context clearly indicates otherwise.

Hereinafter, exemplary embodiments of a personal air vehicle and a control method thereof according to an aspect will be described in detail with reference to the accompanying drawings.

FIG. 1 is an external view of a personal air vehicle according to an exemplary embodiment of the present disclosure. Referring to FIG. 1, the personal air vehicle 10 according to an exemplary embodiment may include a main body 11 on which a user boards and a propulsion device 12 configured to supply propulsion for flight.

The body 11 may include a control device (not shown) or controller configured to operate the personal air vehicle 10, and a display device (not shown) configured to display the state of the personal air vehicle 10. In addition, the main body 11 may include a cockpit (not shown) in which a pilot may be located and a passenger seat (not shown) in which a passenger may be located. In addition, the main body 11 may include at least one of an indoor speaker (not shown)

configured to provide sound information to an occupant or an outdoor speaker (not shown) configured to provide sound information to the outside.

The propulsion device 12, as shown in FIG. 1, may be disposed at the top of the body 11, may be configured to provide a propulsion for the flight of the personal air vehicle 10, and may correspond to a propeller that propels the personal air vehicle 10 by changing the rotational force of the prime mover to thrust (e.g., forward force). However, the position and type of the propulsion device 12 are not limited to the above example. There are no restrictions as to the location and type that may provide propulsion for the flight of the personal air vehicle 10. Hereinafter, the propulsion device 12 may be located at the top of the main body, and the propeller is described as an example.

The personal air vehicle 10 according to an exemplary embodiment may include a horn 13 provided on the front surface of an outdoor speaker. The horn 13 corresponds to a tube having a taper to provide a large radiation resistance to the diaphragm of the outdoor speaker, and may be configured to radiate to the space while amplifying directional sound waves by increasing the cross-sectional area from the opening near the diaphragm toward the end.

At this time, the horn 13 may be extended beyond the radius of the propulsion device 12 to block turbulence noise generated by the propulsion device 12. In particular, among the openings of the horn 13, the opening farthest from the diaphragm (e.g., the end of the horn 13) may be located in front of the end of the propeller of the propulsion device 12 relative to the main body 11. Accordingly, the horn 13 may be configured to block turbulence noise generated from the propulsion device 12, thereby preventing distortion of sound output from an outdoor speaker that may be caused by turbulence noise.

Figure 2:
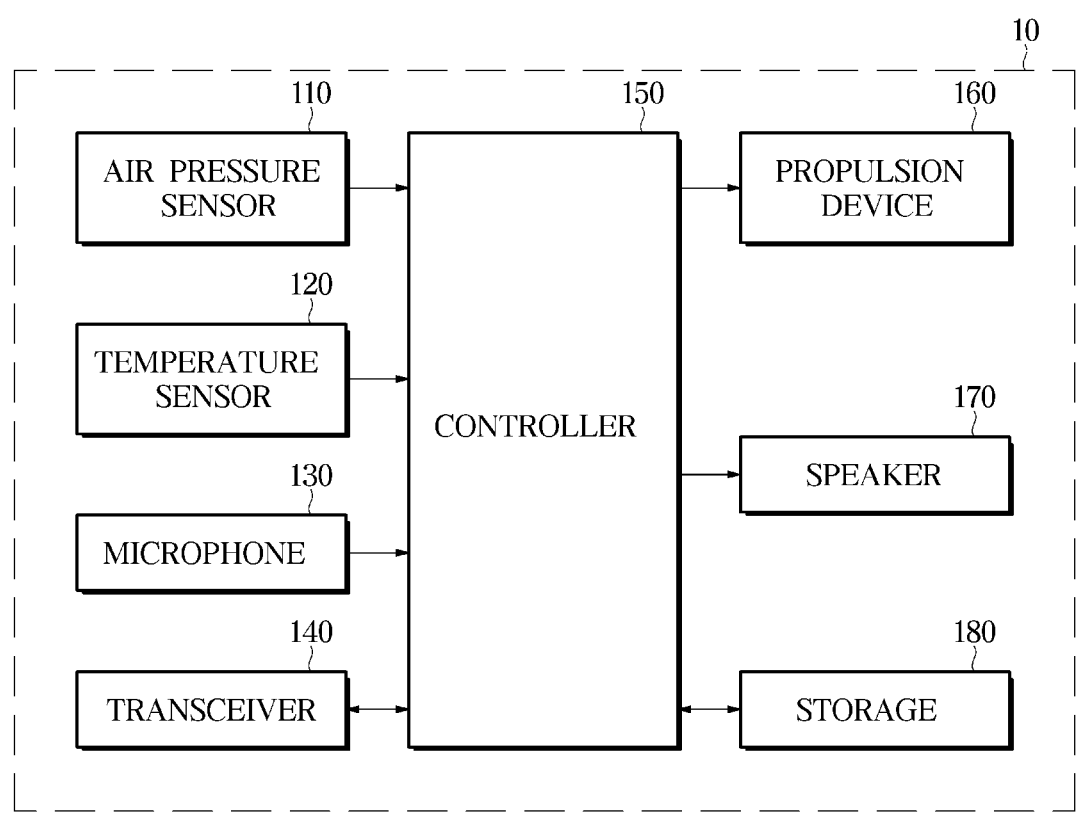
FIG. 2 is a control block diagram of a personal air vehicle according to an exemplary embodiment of the present disclosure.

FIG. 2 is a control block diagram of a personal air vehicle according to an exemplary embodiment of the present disclosure. Referring to FIG. 2, a personal air vehicle 10 according to an exemplary embodiment may include an air pressure sensor 110 configured to sense external air pressure, a temperature sensor 120 configured to sense the external temperature, a microphone 130 configured to collect external noise, a transceiver 140 configured to communicate with an external electronic device, a controller 150 configured to adjust the acoustic signal supplied to the speaker 170, a propulsion device 160 configured to supply propulsion for flight, a speaker 170 that outputs sound based on an acoustic signal, and a storage 180 configured to store various information necessary for control.

The air pressure sensor 110 according to an exemplary embodiment may be disposed on one surface of the main body 11 to sense external air pressure, and may correspond to a barometer of a known type. In other words, the air pressure sensor 110 may be configured to output data regarding external air pressure by detecting a change in air pressure in real time according to a change in altitude. The air pressure sensor 110 may correspond to an altitude meter of a known type other than a barometer according to an exemplary embodiment, and may be configured to determine external air pressure corresponding to altitude by calculating data for altitude and may be configured to output data about external air pressure.

The temperature sensor 120 according to an exemplary embodiment may be disposed on one surface of the main body 11 to sense an external temperature, and may correspond to a thermometer of a known type. In other words, the temperature sensor 120 may be configured to detect the temperature changing according to the altitude change in real time and output data about the external temperature. The microphone 130 according to an exemplary embodiment may be disposed on one surface of the main body 11 to receive external noise, and may correspond to a microphone of a known type.

Specifically, the microphone 130 may be configured to collect external noise (e.g., turbulence noise) generated from the propeller of the propulsion device 12 and may also be configured to collect sound output from an external vehicle. At this time, the microphone 130, according to an exemplary embodiment, may be provided as a stereo microphone including a plurality of microphone elements, and may be configured to collect information regarding a received direction in addition to the volume of the received sound.

The transceiver 140 may be configured to transmit and receive data with an external electronic device via wireless communication of a known communication protocol. Specifically, the transceiver 140 may be configured to receive a global positioning system (GPS) signal from a satellite, and may be configured to transmit and receive data with an external vehicle or an external server. The controller 150 according to an exemplary embodiment may be configured to adjust the acoustic signal supplied to the speaker 170 to compensate for sound that may be distorted according to the flight of the personal air vehicle 10.

In particular, according to the exemplary embodiment, the controller 150 may be configured to adjust the acoustic signal supplied to the speaker 170 by reflecting the external air pressure change caused based on the altitude change according to the flight of the personal air vehicle 10. In other words, the controller 150 may be configured to adjust the acoustic signal supplied to the speaker 170 based on the difference value between the external air pressure that varies according to altitude and the internal air pressure of the enclosure of the speaker 170. In other words, the controller 150 may be configured to adjust the current value of the acoustic signal to cancel the bias corresponding to the distance that the voice coil of the speaker 170 moved in the opposite direction of the enclosure according to the difference between the external air pressure and the internal air pressure of the enclosure of the speaker 170.

In addition, the controller 150 may be configured to adjust the acoustic signal supplied to the speaker 170 by reflecting the temperature change caused based on the altitude change according to the flight of the personal air vehicle 10. In other words, the controller 150 may be configured to adjust the acoustic signal based on the external temperature sensed by the temperature sensor 120 to compensate for the movement of the voice coil of the speaker 170 varying according to the temperature.

Further, the controller 150 may be configured to adjust the acoustic signal supplied to the speaker 170 by reflecting external noise. For example, the controller 150 may be configured to adjust the acoustic signal to cancel turbulence noise caused by the propulsion device 160. In other words, the controller 150 may be configured to adjust the acoustic signal supplied to the speaker 170 by reflecting at least one of external air pressure change, temperature change, or external noise. Adjusting the acoustic signal will be described in detail later. The controller 150 according to an exemplary embodiment may be configured to operate the speaker 170 to output an emergency sound having a preset frequency and a preset size in response to detecting is an abnormality in the transceiver 140.

At this time, the emergency sound may correspond to an acoustic signal that is not adjusted based on the change in external air pressure. In response to receiving an emergency sound from an external personal air vehicle through the microphone 130, the controller 150 may be configured to determine the altitude of the external personal air vehicle based on the bias in the emergency sound, and determine the distance to the external personal air vehicle based on the size of the emergency sound.

The controller 150 may be configured to determine the location of the external personal air vehicle based on the determined altitude and distance, and operate the transceiver 140 to transmit the determined location to the rescue center server. The emergency sound will be described in detail again later. The controller 150 may include at least one memory in which programs for performing the above-described operations and the operations described below may be stored, and at least one processor for executing the stored programs. In the case of a plurality of memory and processors, it may be possible that they are integrated in one chip, and it may also be possible to be provided in a physically separate location.

The propulsion device 160 according to an exemplary embodiment is a device configured to supply propulsion for flight, and may correspond to the propulsion device 12 in FIG. 1. The speaker 170 may include at least one of an indoor speaker configured to provide acoustic information to an occupant or an outdoor speaker configured to provide acoustic information to the outside, and may be configured to output sound based on an acoustic signal supplied from the controller 150. The structure of the speaker 170 will be described in detail again later.

The storage 180 according to an exemplary embodiment may be configured to store various information necessary for the control of the personal air vehicle 10. For example, the storage 180 may be configured to store information on the bias corresponding to the distance the voice coil has moved according to external air pressure, information on the electromagnetic force applied to the voice coil at a reference temperature, and the like. At least one component may be added or deleted in response to the performance of the components of the personal air vehicle 10 shown in FIG. 2. In addition, it will be readily understood by those skilled in the art that the mutual location of components may be changed in response to the performance or structure of the system.

Figure 3:
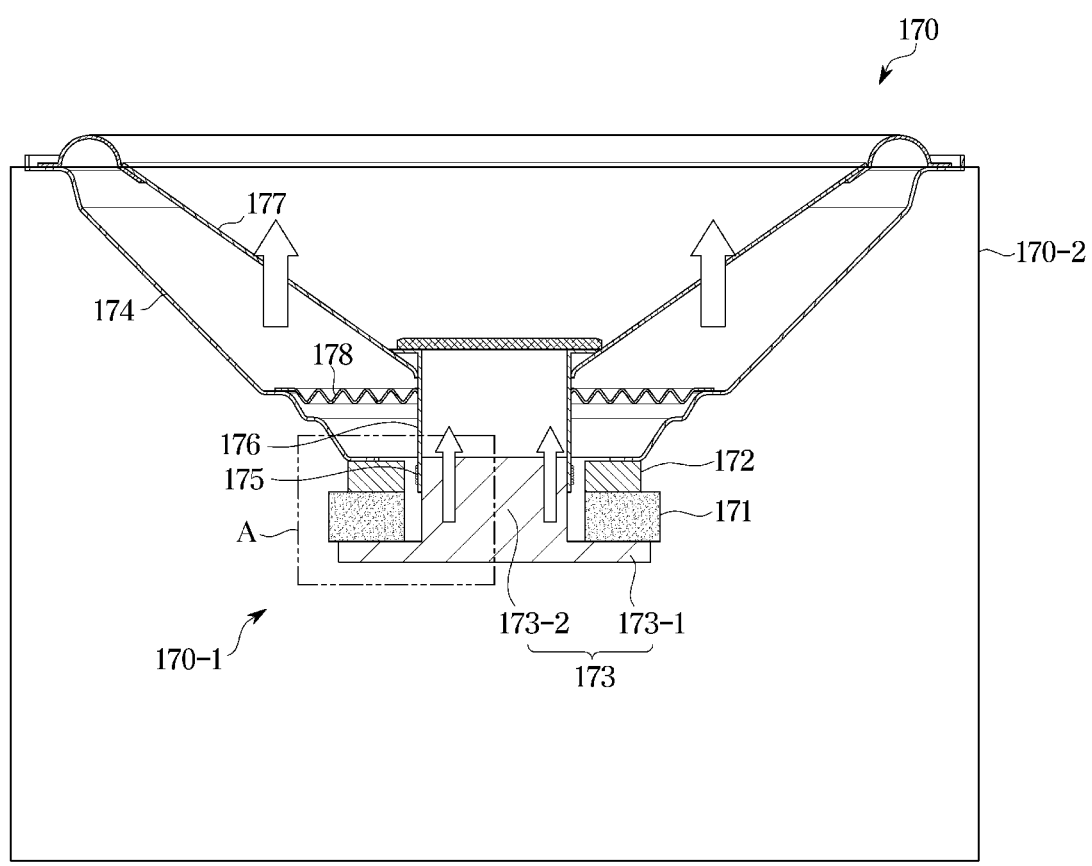
FIG. 3 is a cross-sectional view of a speaker according to an exemplary embodiment of the present disclosure.
Figure 4:
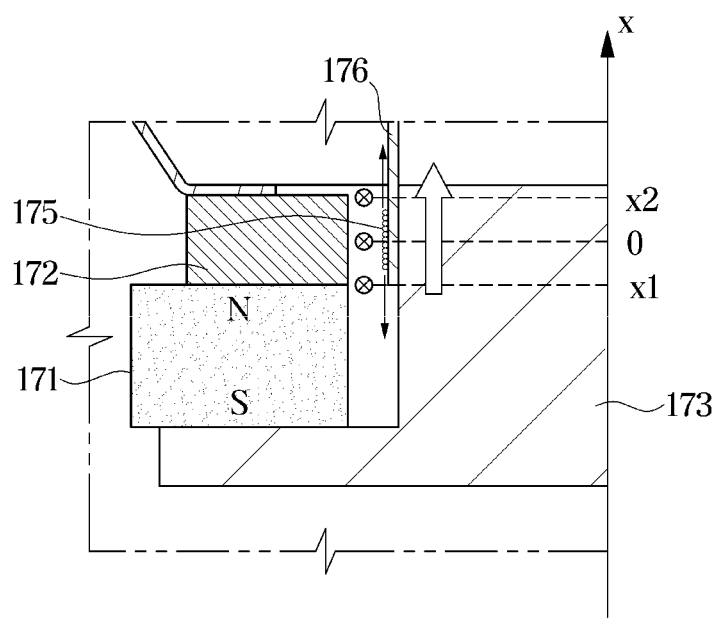
FIG. 4 is an enlarged view of part A of FIG. 3 according to an exemplary embodiment of the present disclosure.
Figure 5:
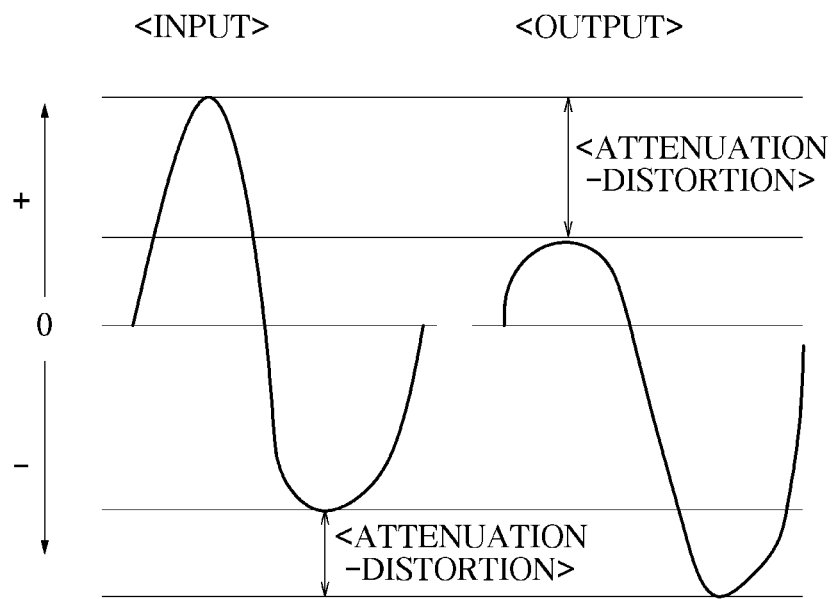
FIG. 5 is a view for describing that a personal air vehicle according to an exemplary embodiment of the present disclosure adjusts an acoustic signal.
Figure 5:
Figure 5:
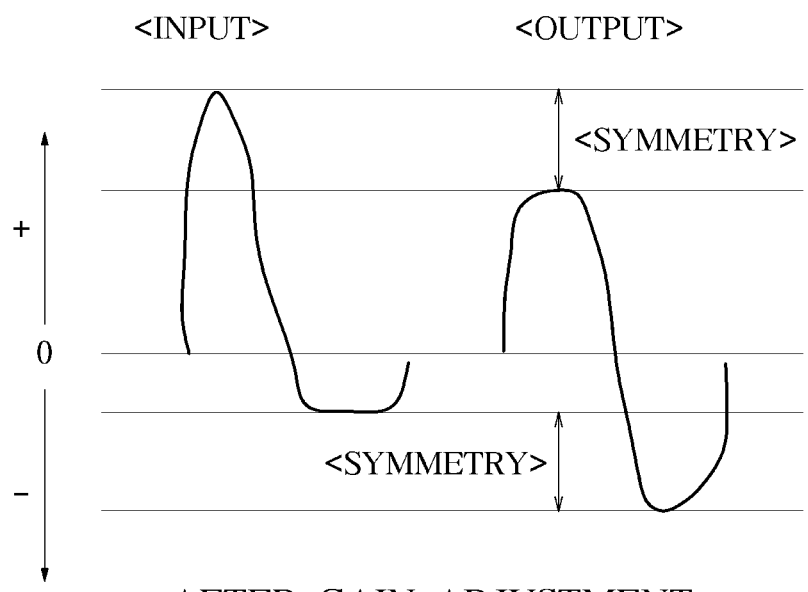

In the above, each configuration of the personal air vehicle 10 has been described. Hereinafter, the controller 150 will be described in detail for adjusting the acoustic signal. FIG. 3 is a cross-sectional view of a speaker according to an exemplary embodiment of the present disclosure. FIG. 4 is an enlarged view of part A of FIG. 3. FIG. 5 is a view for describing that a personal air vehicle according to an exemplary embodiment of the present disclosure adjusts an acoustic signal.

Referring to FIG. 3, the speaker 170 may include a speaker unit 170-1 configured to output sound and an enclosure 170-2 that accommodates the speaker unit 170-1. Speaker unit 170-1 may include a magnet 171 configured to generate magnetic flux, a top plate 172 that forms a path of the magnetic flux generated in the magnet 171, and a yoke 173 that supports the magnet 171. The yoke 173 may include a back plate 173-1 provided at the rear to support the magnet 171, and a pole piece 173-2 that protrudes forward from the center of the back plate 173-1.

In addition, the speaker unit 170-1 may include a frame 174, a voice coil 175 disposed in a magnetic gap between the top plate 172 and the pole piece 173-2 and interacting with the magnetic flux inside the magnetic gap to move in the front-rear direction when a current is applied, a bobbin 176 on which the voice coil 175 is wound, and a vibration plate (cone paper) 177 that vibrates according to the movement of the voice coil 175 to generate sound pressure, and a damper 178 that guides the movement direction of the voice coil 175 in the front-rear direction and constrains the movement in the left-right direction.

The enclosure 170-2 may have a preset internal air pressure, and, for example, the internal air pressure may correspond to 1 atm corresponding to atmospheric pressure at the ground surface. In general, at atmospheric pressure on the ground surface, the voice coil 175 may be disposed in the middle of the entire section of the top plate 172 when no current is applied. Referring to FIG. 4, the displacement of the voice coil 175 may be 0 when no current is applied.

Some of the magnetic force lines formed at the N pole of the magnet 171 may reach the S pole of the magnet 171 through the top plate 172, the pole piece 173-2, and the back plate 173-1. The magnetic force line may be formed to be perpendicular to the voice coil 175. At this time, when a current is applied to the voice coil 175, an electromagnetic force is induced to the voice coil 175 by a magnetic field, and the voice coil 175 is vibrated by the electromagnetic force.

The voice coil 175 vibrates and vibrates the vibrating plate 177, and the vibrating plate 177 vibrates according to the movement of the voice coil 175 to generate sound pressure. At this time, the voice coil 175 may be configured to perform a linear motion between the first displacement (x1) and the second displacement (x2) around the displacement 0, based on the magnitude of the applied current. In other words, the voice coil 175 may vibrate. The altitude of the personal air vehicle 10 may be changed based on the flight, and the external air pressure may be changed according to a change in altitude. In other words, as the altitude increases, the external air pressure may be configured to change in a decreasing direction compared to atmospheric pressure at the ground surface (e.g., about 1 atmosphere).

Accordingly, when the external air pressure changes as the personal air vehicle 10 flies, a difference between the external air pressure and the internal air pressure of the enclosure 170-2 may occur, and accordingly, distortion may occur in the speaker 170. Specifically, as the altitude rises, the external air pressure decreases than the internal air pressure of the enclosure 170-2, and accordingly, the voice coil 175 and the vibrating plate 177 may move in the opposite direction (e.g., the direction toward x2) of the enclosure 170-2.

In particular, the voice coil 175 is not located in the middle of the entire section of the top plate 172 when the current is not applied due to the air pressure difference, but may be positioned by moving in the opposite direction of the enclosure 170-2. In other words, the voice coil 175 may be moved to a position that may be located only when a current is applied at atmospheric pressure on the ground surface of the surface, even when a current is not applied due to a difference in air pressure. Particularly, when an acoustic signal is applied to the voice coil 175, a sound different from the sound at atmospheric pressure on the ground surface may be output and distortion may occur.

As a result, the voice coil 175 may be positioned at the same position as the bias applied at atmospheric pressure on the ground surface even in a situation where no current is applied due to a difference in air pressure. Accordingly, as shown in FIG. 5, the output sound before gain adjustment may be shifted as if a constant bias is applied to the input acoustic signal.

In order to compensate for distortion in the speaker 170 according to the air pressure difference, the controller 150 may be configured to adjust an acoustic signal supplied to the speaker 170 based on a difference value between an external air pressure that varies according to altitude and an internal air pressure of the enclosure 170-2. In other words, the controller 150 may be configured to adjust the current value of the acoustic signal to cancel the bias corresponding to the degree to which the voice coil 175 of the speaker 170 moves according to the difference value between the external air pressure and the internal air pressure of the enclosure 170-2.

At this time, the bias corresponding to the distance the voice coil moved 175 may correspond to the magnitude of direct current required to move the voice coil 175 by the corresponding travel distance at atmospheric pressure on the surface. In other words, the controller 150 may be configured to generate an adjusted acoustic signal by subtracting the current value corresponding to the bias from the current value corresponding to the existing acoustic signal. In other words, as shown in FIG. 5, the controller 150 may be configured to supply an input acoustic signal subtracting the current value equal to the bias to the speaker 170, and the sound output from the speaker 170 may be intended sound.

Figure 6:
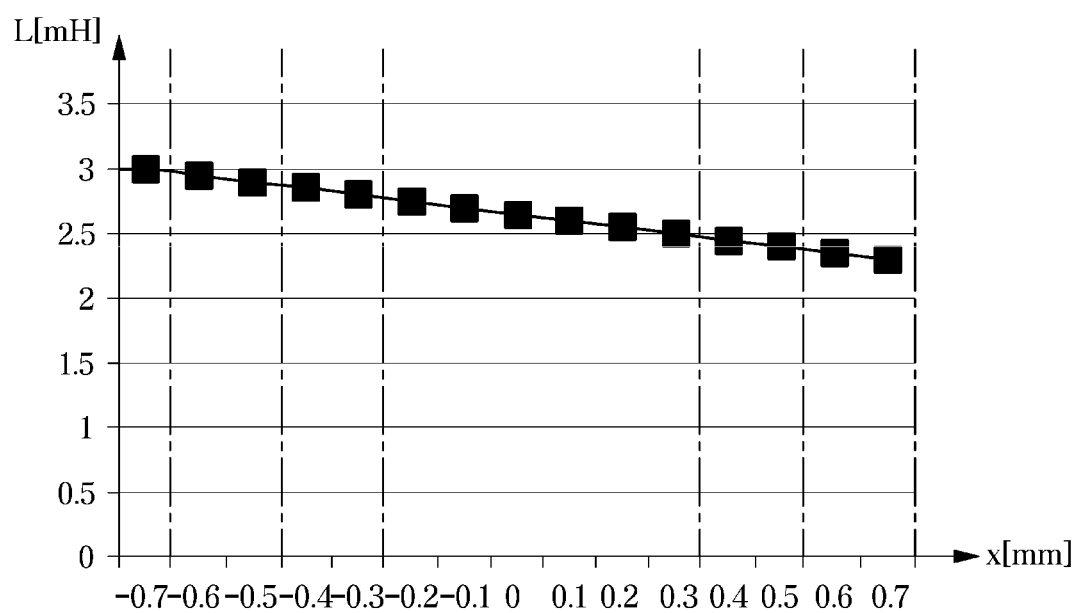
FIG. 6 is a view for describing a change in inductance according to the temperature of the speaker according to an exemplary embodiment of the present disclosure.

FIG. 6 is a view for describing a change in inductance according to the temperature of the speaker according to an exemplary embodiment of the present disclosure. In general, the higher the altitude, the lower the external temperature, and accordingly, the speaker 170 in the personal air vehicle 10 may be exposed to a low temperature environment. This change in temperature causes a change in the magnetic flux density of the magnet 171 of the speaker 170, and such a change in the magnetic flux density results in a change in the output of the speaker 170. Distortion of sound quality may occur according to a change in the output of the speaker 170.

In other words, a change in magnetic flux density according to temperature may bring about a change in electromagnetic force, and the strength of a force acting on the voice coil 175 is changed according to the change in the electromagnetic force, so that the displacement of the voice coil 175 may be changed. The displacement of the voice coil 175 is related to the inductance of the voice coil 175 (e.g., the inductance of the speaker 170). In other words, the amount of change in the inductance of the voice coil 175, as shown in FIG. 6, may vary based on the temperature and this is because the strength of the force acting on the voice coil 175 is changed by changing the magnetic flux density in the magnet 171 according to the temperature. The amount of change in the inductance according to the temperature also affects the movement of the voice coil 175, and thus may affect the output of the speaker 200.

The controller 150 may be configured to adjust an acoustic signal supplied to the speaker 170 to compensate for a change in output of the speaker 170 according to temperature. Specifically, the controller 150 may be configured to compare the external temperature sensed using the temperature sensor 120 with a preset reference temperature, and adjust an acoustic signal supplied to the speaker 170 according to the comparison result.

In response to determining that the external temperature is different from the preset reference temperature, the controller 150 may be configured to determine a compensation current for compensating a change in the magnetic flux of the speaker 170 with respect to temperature based on the external temperature, and adjust an acoustic signal supplied to the speaker 170 based on the determined compensation current. In other words, the controller 150 may be configured to determine the compensation current so that the output of the speaker 170 for a preset reference temperature matches the output of the speaker 170 for an external temperature.

The controller 150 may be configured to compare the strength of the electromagnetic force (e.g., first electromagnetic force) acting on the voice coil 175 at the current external temperature and the strength of the electromagnetic force (e.g., second electromagnetic force) acting on the voice coil 175 at a preset reference temperature and may be configured to determine a compensation current capable of compensating for a difference between the strength of the first electromagnetic force and the strength of the second electromagnetic force.

Thereafter, the controller 150 may be configured to determine a compensation current for generating an electromagnetic force having an strength equal to the difference between the first electromagnetic force and the second electromagnetic force and may be configured to adjust the acoustic signal to be supplied to the speaker 170 by adding or subtracting the compensation current to the acoustic signal that is supplied to the speaker 170. Specifically, when the first electromagnetic force is less than the second electromagnetic force, the controller 150 may be configured to add a compensation current for generating an electromagnetic force having a strength equal to the difference between the first electromagnetic force and the second electromagnetic force to the current supplied to the speaker 170. The second electromagnetic force may act on the voice coil 175 according to the compensation current, and even when the external temperature is different from the reference temperature, since the same electromagnetic force as the reference temperature acts, the output of the speaker 170 is consistent. Therefore, the speaker 170 may be configured to output sound without loss, and loss of sound quality may be prevented.

Alternatively, when the first electromagnetic force is greater than the second electromagnetic force, the controller 150 may be configured to subtract the compensation current for generating the electromagnetic force having strength equal to the difference between the first electromagnetic force and the second electromagnetic force from the current supplied to the speaker 170. A second electromagnetic force may act on the voice coil 175 according to the compensation current, and even when the external temperature is different from the reference temperature, since the same electromagnetic force as the reference temperature acts, the output of the speaker 170 is consistent. Therefore, the speaker 170 may be configured to output sound without loss, and loss of sound quality may be prevented.

The controller 150 may be configured to adjust an acoustic signal to amplify a frequency region corresponding to external noise that is collected through the microphone 130 to prevent distortion in the speaker 170 due to external noise generated from the propulsion device 160. Accordingly, the microphone 130 may be located at the end of the horn 13 through which sound is output, and may be configured to collect external noise (e.g., turbulence noise) affecting the sound transmitted to the user. Specifically, the controller 150 may be configured to determine the compensation current so that the sound pressure of the sound output by the sound pressure corresponding to the external noise may be increased, and may be configured to adjust the acoustic signal by adding the compensation current.

As described above, the personal air vehicle 10 may be configured to provide sound without distortion by adjusting an acoustic signal supplied to the speaker 170 by reflecting at least one of external air pressure change, temperature change, or external noise. In the above, adjusting the acoustic signal has been described. Hereinafter, it will be described in detail with respect to performing communication with an external personal air vehicle through the sound.

Figure 7:
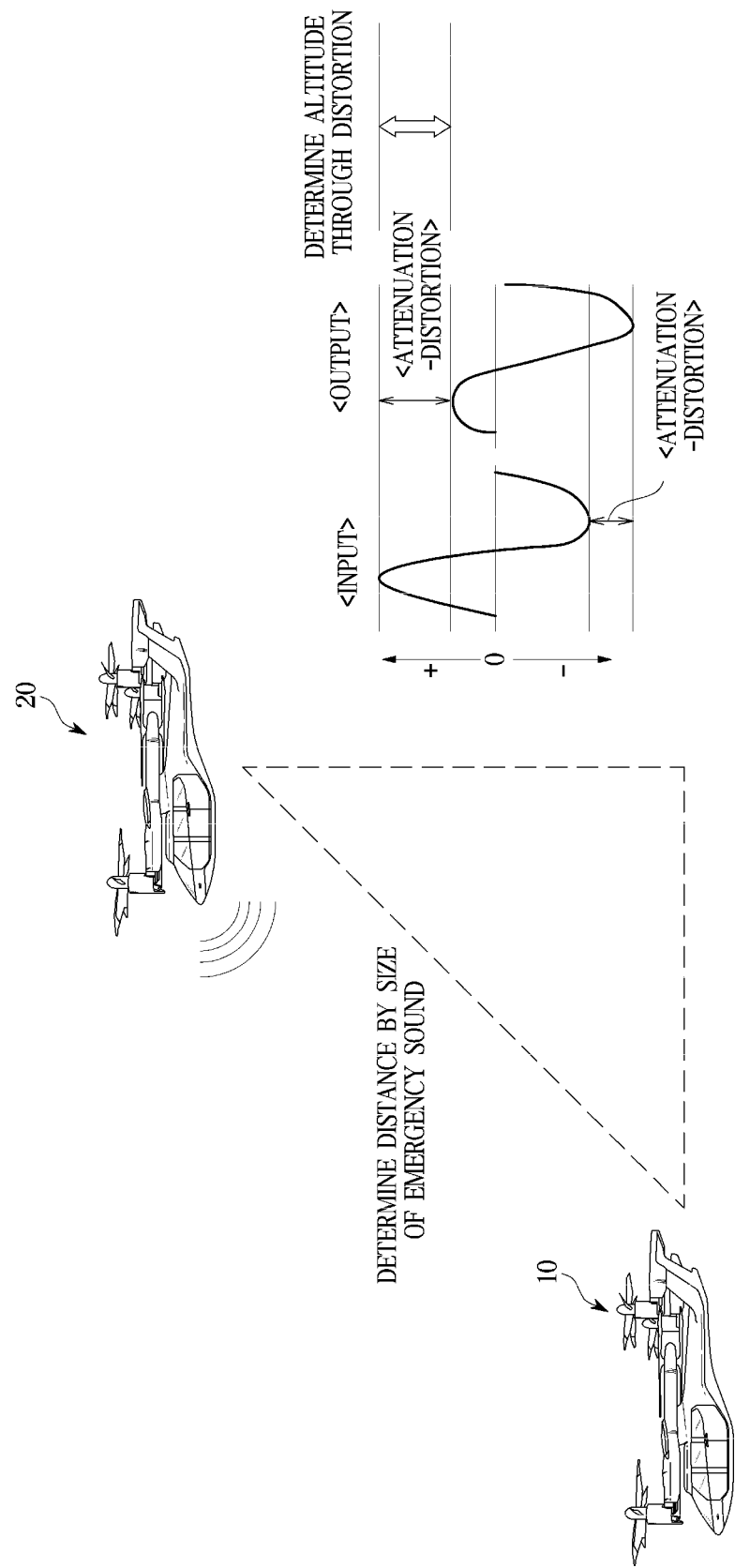
FIG. 7 is a view illustrating a case in which the personal air vehicle according to an exemplary embodiment of the present disclosure determines the location of the external personal air vehicle.

FIG. 7 is a view illustrating a case in which the personal air vehicle according to an exemplary embodiment of the present disclosure determines the location of the external personal air vehicle. Referring to FIG. 7, in response to detecting an abnormality in the transceiver 140, the controller 150 may be configured to operate the speaker 170 to output an emergency sound having a preset frequency and a preset size (e.g., sound pressure).

In other words, when the GPS signal is not received due to the abnormality of the transceiver 140, and thus driving is impossible, the personal air vehicle 10 according to an exemplary embodiment may be configured to perform communication for a rescue request by outputting the emergency sound through the speaker 170. At this time, the emergency sound may correspond to an acoustic signal that is not adjusted based on the change in external air pressure. In other words, the controller 150 may not perform the adjustment based on the air pressure difference for the acoustic signal corresponding to the emergency sound despite the pressure difference between the external air pressure detected using the air pressure sensor 110 and the internal air pressure of the enclosure 170-2 of the speaker 170.

Through this, another device that has received the emergency sound may be configured to determine the altitude of the personal air vehicle 10 that has transmitted the emergency sound based on the degree of distortion of the emergency sound according to the air pressure difference. In response to receiving an emergency sound from an external personal air vehicle 20 through the microphone 130, the controller 150 may be configured to determine the altitude of the external personal air vehicle based on the bias in the emergency sound.

In other words, in response to receiving a sound having a preset frequency, the controller 150 may be configured to determine the received sound as an emergency sound and determine a bias corresponding to the distance that the voice coil in the external personal air vehicle 20 moved in the opposite direction of the enclosure according to the air pressure difference based on the shifted degree of the emergency sound.

At this time, the controller 150 may be configured to determine the external air pressure at the point where the external personal air vehicle 20 is located based on the information on the bias corresponding to the distance the voice coil traveled according to the external air pressure and determine the altitude of the external personal air vehicle 20 based on information on the correlation between external air pressure and altitude.

In addition, the controller 150 may be configured to determine the distance to the external personal air vehicle 20 based on the size of the emergency sound. Since the emergency sound is output in a preset size, the controller 150 may be configured to determine the degree of attenuation of the received emergency sound by comparing the size of the emergency sound received through the microphone 130 with a preset size in consideration of the attenuation coefficient in the air medium and may be configured to determine a distance corresponding to the degree of attenuation as a distance to the external personal air vehicle 20.

The controller 150 may be configured to determine the location of the external personal air vehicle 20 based on the determined altitude of the external personal air vehicle 20 and the distance to the external personal air vehicle 20 and may be configured to operate the transceiver 140 to transmit the location of the external personal air vehicle 20 to the rescue center server. In other words, in response to receiving an emergency sound from the external personal air vehicle (20), the personal air vehicle 10 may be configured to determine the location of the external personal air vehicle 20 based on the emergency sound enables the external personal air vehicle 20 to be rescued when the rescue center sends rescue equipment to the external personal air vehicle 20 by transmitting the determined position to the rescue center server.

Hereinafter, a control method of the personal air vehicle 10 according to an exemplary embodiment will be described. The personal air vehicle 10 according to the above-described embodiment may be applied to the control method of the personal air vehicle 10 described later. Therefore, the contents described with reference to FIGS. 1 to 7 may be applied to the control method of the personal air vehicle 10 according to an exemplary embodiment even if there is no special mention.

Figure 8:
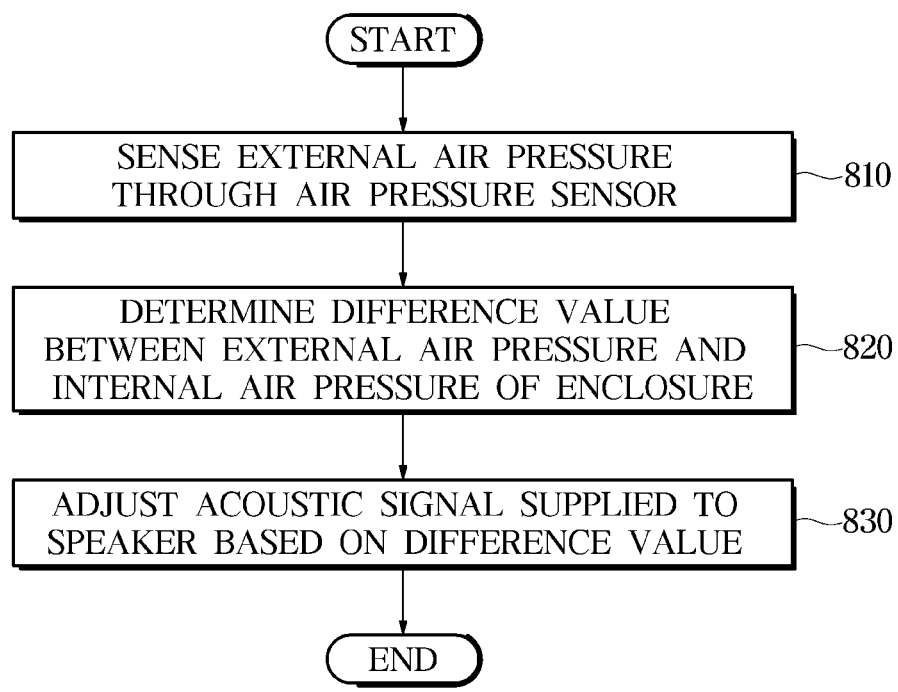
FIG. 8 is a flowchart of adjusting an acoustic signal based on air pressure that varies depending on altitude among control methods of a personal air vehicle according to an exemplary embodiment of the present disclosure.

FIG. 8 is a flowchart of adjusting an acoustic signal based on air pressure that varies depending on altitude among control methods of a personal air vehicle according to an exemplary embodiment of the present disclosure. Referring to FIG. 8, the personal air vehicle 10 according to an exemplary embodiment may be configured to sense external air pressure using the air pressure sensor 110 (810).

The altitude of the personal air vehicle 10 may be changed based on the flight, and the external air pressure may be changed according to a change in altitude. In other words, as the altitude increases, the external air pressure may be configured to change in a decreasing direction compared to atmospheric pressure at the ground surface (e.g., about 1 atmosphere). Accordingly, when the external air pressure changes as the personal air vehicle 10 flies, a difference between the external air pressure and the internal air pressure of the enclosure 170-2 may occur, and accordingly, distortion may occur in the speaker 170.

Specifically, as the altitude rises, the external air pressure becomes lower than the internal air pressure of the enclosure 170-2, and accordingly, the voice coil 175 and the vibrating plate 177 may move in the opposite direction (e.g., the direction toward x2) of the enclosure 170-2. In particular, the voice coil 175 is not located in the middle of the entire section of the top plate 172 when the current is not applied due to the air pressure difference, but may be positioned by moving in the opposite direction of the enclosure 170-2.

In other words, the voice coil 175 may be moved to a position that may be located only when a current is applied at atmospheric pressure on the ground surface of the surface, even when a current is not applied due to a difference in air pressure. Particularly, when an acoustic signal is applied to the voice coil 175, a sound different from the sound at atmospheric pressure on the ground surface may be output and distortion may occur. As a result, the voice coil 175 may be positioned at the same position as the bias applied at atmospheric pressure on the ground surface even in a situation where no current is applied due to a difference in air pressure.

In order to compensate for distortion in the speaker 170 according to the air pressure difference, the personal air vehicle 10 according to an exemplary embodiment may be configured to determine a difference value between external air pressure and internal air pressure of the enclosure 170-2 (820) and may be configured to adjust the acoustic signal supplied to the speaker 170 based on the difference value (830). In other words, the controller 150 may be configured to adjust the current value of the acoustic signal to cancel the bias corresponding to the degree to which the voice coil 175 of the speaker 170 moves according to the difference value between the external air pressure and the internal air pressure of the enclosure 170-2. At this time, the bias corresponding to the distance the voice coil moved 175 may correspond to the magnitude of direct current required to move the voice coil 175 by the corresponding travel distance at atmospheric pressure on the surface.

Figure 9:
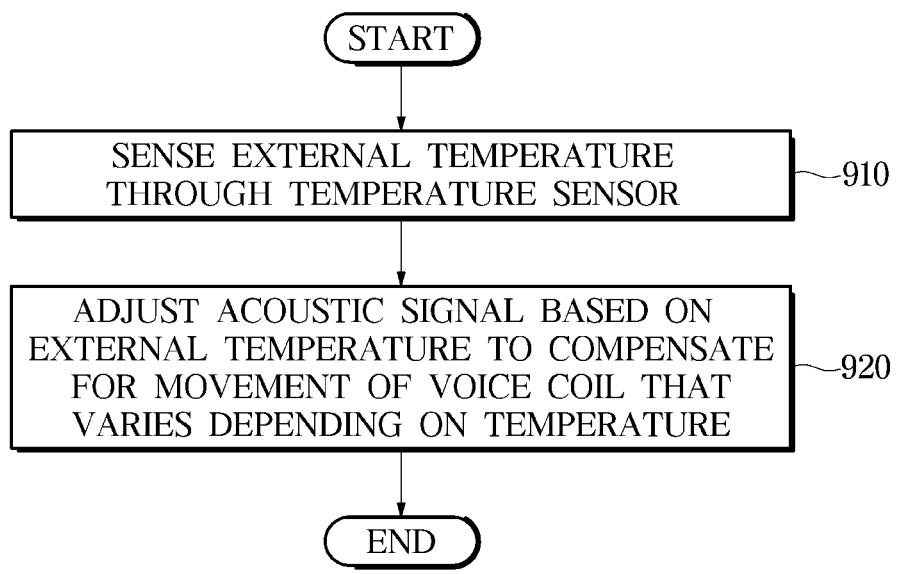
FIG. 9 is a flow chart of adjusting an acoustic signal based on an external temperature among a control method of a personal air vehicle according to an exemplary embodiment of the present disclosure.

FIG. 9 is a flow chart of adjusting an acoustic signal based on an external temperature among a control method of a personal air vehicle according to an exemplary embodiment of the present disclosure. Referring to FIG. 9, the personal air vehicle 10 according to an exemplary embodiment may be configured to sense an external temperature using the temperature sensor 120 (910).

In general, the higher the altitude, the lower the external temperature, and accordingly, the speaker 170 in the personal air vehicle 10 may be exposed to a low temperature environment. This change in temperature causes a change in the magnetic flux density of the magnet 171 of the speaker 170, and such a change in the magnetic flux density results in a change in the output of the speaker 170. Distortion of sound quality may occur according to a change in the output of the speaker 170. In other words, a change in magnetic flux density according to temperature may bring about a change in electromagnetic force, and the strength of a force acting on the voice coil 175 may be changed according to the change in the electromagnetic force, and thus, the displacement of the voice coil 175 may be changed.

The personal air vehicle 10 according to an exemplary embodiment may be configured to adjust the acoustic signal based on the external temperature to compensate for the movement of the voice coil 175 that varies based on the temperature (920). Specifically, the controller 150 may be configured to compare the external temperature sensed using the temperature sensor 120 with a preset reference temperature, and adjust an acoustic signal supplied to the speaker 170 according to the comparison result.

In response to determining that the external temperature is different from the preset reference temperature, the controller 150 may be configured to determine a compensation current for compensating a change in the magnetic flux of the speaker 170 with respect to temperature based on the external temperature, and adjust an acoustic signal supplied to the speaker 170 based on the determined compensation current. In other words, the controller 150 may be configured to determine the compensation current so that the output of the speaker 170 for a preset reference temperature matches the output of the speaker 170 for an external temperature.

Figure 10:
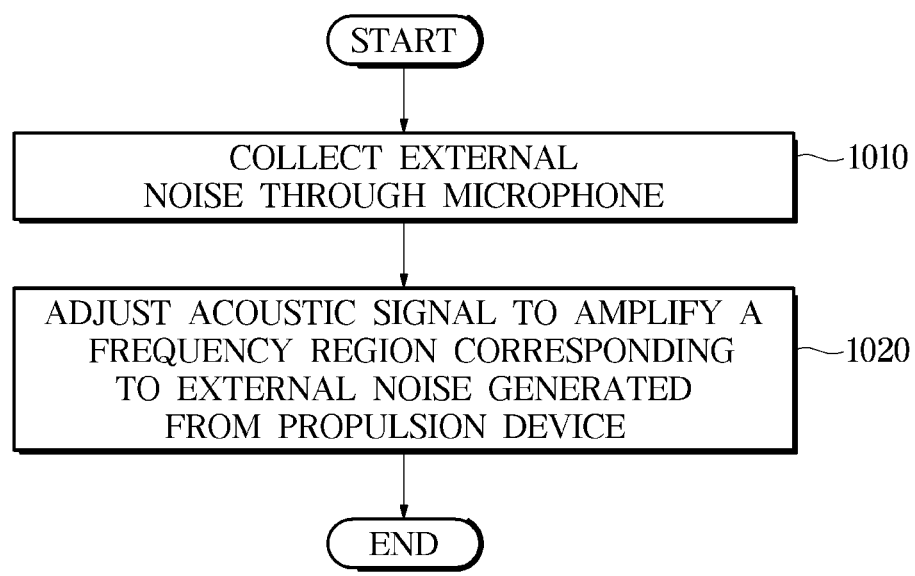
FIG. 10 is a flow chart of adjusting an acoustic signal based on external noise among a control method of a personal air vehicle according to an exemplary embodiment of the present disclosure.

FIG. 10 is a flow chart of adjusting an acoustic signal based on external noise among a control method of a personal air vehicle according to an exemplary embodiment of the present disclosure. Referring to FIG. 10, the personal air vehicle 10 according to an exemplary embodiment may be configured to collect external noise using the microphone 130 (1010) and adjust the acoustic signal to amplify a frequency region corresponding to external noise generated from the propulsion device 160 (1020).

Accordingly, the microphone 130 may be located at the end of the horn 13 through which sound is output, and may be configured to collect external noise (e.g., turbulence noise) affecting the sound transmitted to the user. Specifically, the controller 150 may be configured to determine the compensation current to increase the sound pressure of the sound output by the sound pressure corresponding to the external noise, and adjust the acoustic signal by adding the compensation current.

Figure 11:
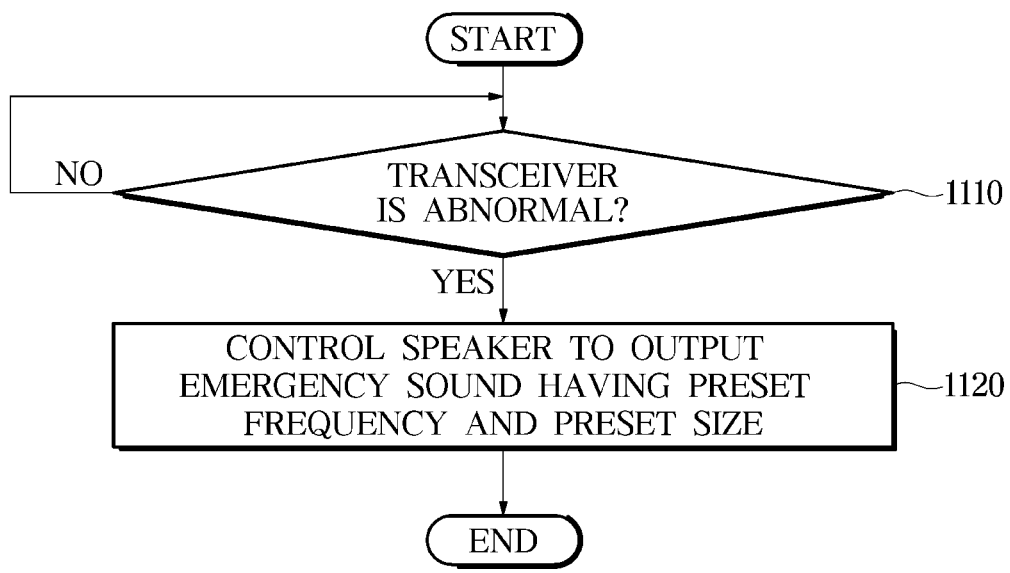
FIG. 11 is a flowchart of outputting an emergency sound when a transceiver is abnormal among control methods of a personal air vehicle according to an exemplary embodiment of the present disclosure.

FIG. 11 is a flowchart of outputting an emergency sound when a transceiver is abnormal (e.g., malfunction, failure, etc.) among control methods of a personal air vehicle according to an exemplary embodiment of the present disclosure. Referring to FIG. 11, in response to detecting that the transceiver 140 is abnormal (YES in 1110), the personal air vehicle 10 may be configured to operate the speaker 170 to output an emergency sound having a preset frequency and a preset size (1120).

In other words, when the GPS signal is not received due to the abnormality of the transceiver 140, and thus driving is impossible, the personal air vehicle 10 may be configured to perform communication for a rescue request by outputting the emergency sound through the speaker 170. At this time, the emergency sound may correspond to an acoustic signal that is not adjusted based on the change in external air pressure. In other words, the controller 150 may not perform the adjustment based on the air pressure difference for the acoustic signal corresponding to the emergency sound despite the pressure difference between the external air pressure detected through the air pressure sensor 110 and the internal air pressure of the enclosure 170-2 of the speaker 170.

Through this, another device that has received the emergency sound may be configured to determine the altitude of the personal air vehicle 10 that has transmitted the emergency sound based on the degree of distortion of the emergency sound according to the air pressure difference.

Figure 12:
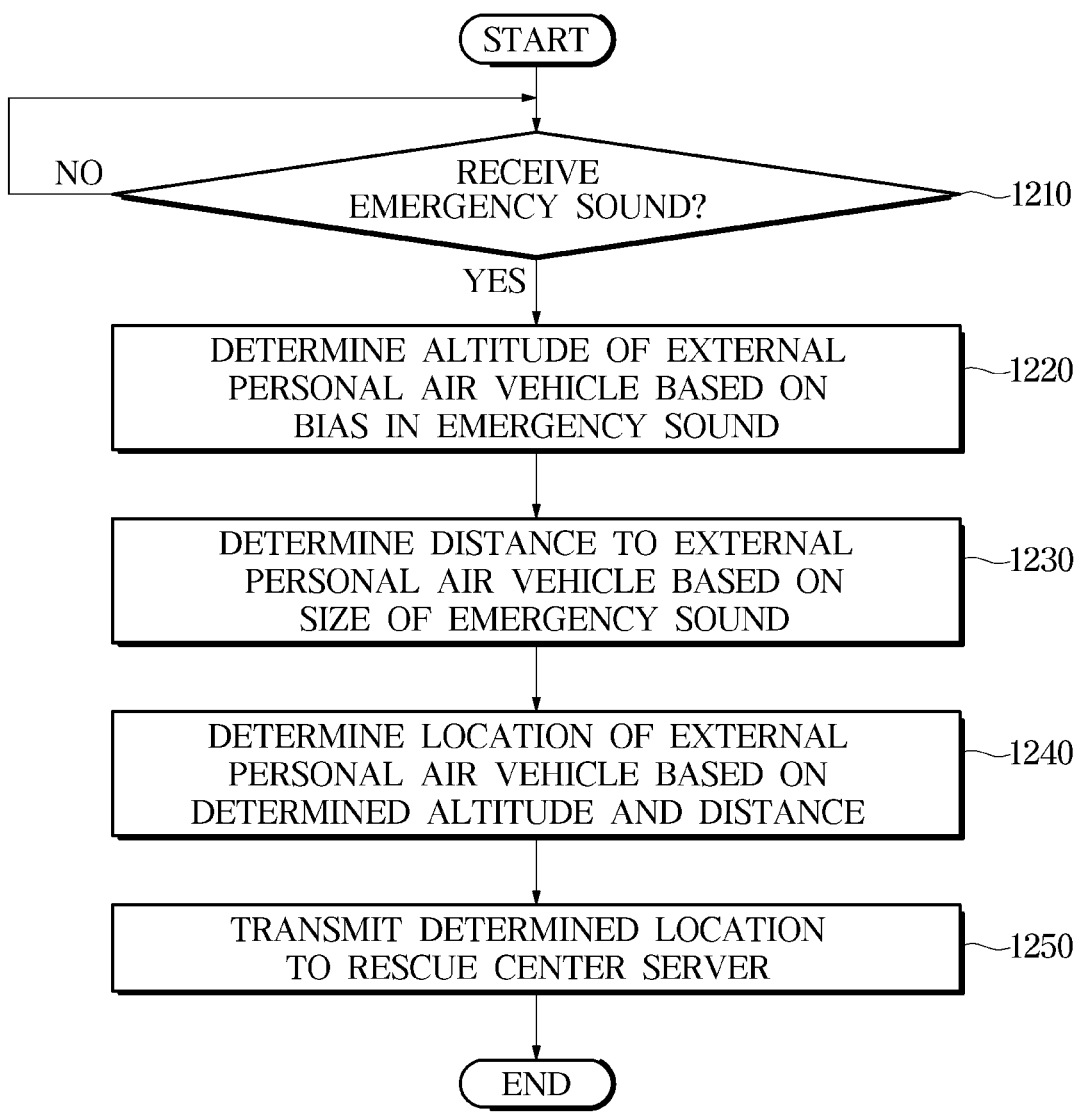
FIG. 12 is a flowchart of receiving an emergency sound from an external personal air vehicle among control methods of a personal air vehicle according to an exemplary embodiment of the present disclosure.

FIG. 12 is a flowchart of receiving an emergency sound from an external personal air vehicle among control methods of a personal air vehicle according to an exemplary embodiment of the present disclosure. Referring to FIG. 12, when receiving an emergency sound (YES in 1210), the personal air vehicle 10 according to an exemplary embodiment may be configured to determine the altitude of the external personal air vehicle 20 based on the bias in the emergency sound (1220). In other words, in response to receiving a sound having a preset frequency, the controller 150 may be configured to determine the received sound as an emergency sound and determine a bias corresponding to the distance that the voice coil in the external personal air vehicle 20 moved in the opposite direction of the enclosure according to the air pressure difference based on the shifted degree of the emergency sound.

At this time, the controller 150 may be configured to determine the external air pressure at the point where the external personal air vehicle 20 is located based on the information regarding the bias corresponding to the distance the voice coil traveled according to the external air pressure and may be configured to determine the altitude of the external personal air vehicle 20 based on information on the correlation between external air pressure and altitude. The personal air vehicle 10 according to an exemplary embodiment may be configured to determine a distance to the external personal air vehicle 20 based on the size of the emergency sound (1230).

Since the emergency sound is output in a preset size, the controller 150 may be configured to determine the degree of attenuation of the received emergency sound by comparing the size of the emergency sound received through the microphone 130 with a preset size based on the attenuation coefficient in the air medium and may be configured to determine a distance corresponding to the degree of attenuation as a distance to the external personal air vehicle 20.

The personal air vehicle 10 may be configured to determine the location of the external personal air vehicle 10 based on the determined altitude and distance (1240), and transmit the determined location to the rescue center server (1250). In other words, in response to receiving an emergency sound from the external personal air vehicle (20), the personal air vehicle 10 may be configured to determine the location of the external personal air vehicle 20 based on the emergency sound that enables the external personal air vehicle 20 to be rescued when the rescue center sends rescue equipment to the external personal air vehicle 20 by transmitting the determined position to the rescue center server.

According to a personal air vehicle (PAV) and a control method thereof according to an aspect, distortion in a speaker due to a change in altitude may be compensated, and sound information not distorted may be provided to a user. In addition, according to the personal air vehicle and control method thereof according to one aspect, it may be possible to provide communication through the speaker in an emergency, to thus respond to a failure of the communication device.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium.

The non-transitory computer-readable recording medium may include all kinds of recording media storing commands that can be interpreted by a computer. For example, the non-transitory computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A personal air vehicle (PAV), comprising:
    an air pressure sensor configured to sense external air pressure;
    a propulsion device configured to supply propulsion for flight;
    a speaker including an enclosure having a preset internal air pressure; and
    a controller configured to adjust an acoustic signal supplied to the speaker based on a difference value between the external air pressure and the internal air pressure changing according to altitude.

2. The personal air vehicle according to claim 1, wherein the controller is configured to adjust the current value of the acoustic signal to cancel the bias corresponding to the distance that the voice coil of the speaker moved in the opposite direction of the enclosure according to the difference value.

3. The personal air vehicle according to claim 1, further comprising:
    a temperature sensor configured to sense the external temperature,
    wherein the controller is configured to adjust the acoustic signal based on the external temperature to compensate for the movement of the voice coil of the speaker changing according to temperature.

4. The personal air vehicle according to claim 1, further comprising:
    a microphone configured to collect external noise,
    wherein the controller is configured to adjust the acoustic signal to amplify the frequency region that corresponds to the external noise generated from the propulsion device.

5. The personal air vehicle according to claim 4, further comprising:
    a transceiver configured to communicate with an external device,
    wherein the controller is configured to operate the speaker to output an emergency sound having a preset frequency and a preset size in response to detecting an abnormality in the transceiver.

6. The personal air vehicle according to claim 5, wherein the emergency sound is an acoustic signal not adjusted based on the difference value between the external air pressure and the internal air pressure.

7. The personal air vehicle according to claim 6, wherein in response to receiving an emergency sound from an external personal air vehicle through the microphone, the controller is configured to determine an altitude of the external personal air vehicle based on a bias in the emergency sound, determine the distance to the external personal air vehicle based on the size of the emergency sound and determine the location of the external personal air vehicle based on the altitude of the external personal air vehicle and the distance to the external personal air vehicle.

8. The personal air vehicle according to claim 7, wherein the controller is configured to operate the transceiver to transmit the location of the external personal air vehicle to the rescue center server.

9. The personal air vehicle according to claim 1, wherein the personal air vehicle further includes a horn provided on the front surface of the speaker, and the horn extends beyond the radius of the propeller of the propulsion device.

10. A control method of a personal air vehicle (PAV) comprising an air pressure sensor configured to sense external air pressure, a propulsion device configured to supply propulsion for flight, a speaker including an enclosure having a preset internal air pressure, the method comprises:
    adjusting, by a controller, an acoustic signal supplied to the speaker based on a difference value between the external air pressure and the internal air pressure changing according to altitude.

11. The control method according to claim 10, wherein the adjusting the acoustic signal supplied to the speaker includes:
    adjusting, by the controller, the current value of the acoustic signal to cancel the bias corresponding to the distance that the voice coil of the speaker moved in the opposite direction of the enclosure according to the difference value.

12. The control method according to claim 10, wherein the personal air vehicle further includes a temperature sensor configured to sense the external temperature,
    wherein the method further includes:
    adjusting, by the controller, the acoustic signal based on the external temperature to compensate for the movement of the voice coil of the speaker changing according to temperature.

13. The control method according to claim 10, wherein the personal air vehicle further includes a microphone configured to collect external noise,
wherein the method further includes:
adjusting, by the controller, the acoustic signal to amplify the frequency region corresponding to the external noise generated from the propulsion device.

14. The control method according to claim 13, wherein the personal air vehicle further includes a transceiver configured to communicate with an external device,
wherein the method further includes:
operating, by the controller, the speaker to output an emergency sound having a preset frequency and a preset size when there is an abnormality in the transceiver.

15. The control method according to claim 14, wherein the emergency sound is an acoustic signal not adjusted based on the difference value between the external air pressure and the internal air pressure.

16. The control method according to claim 15, further comprising:
in response to receiving an emergency sound from an external personal air vehicle through the microphone, determining, by the controller, an altitude of the external personal air vehicle based on a bias in the emergency sound;
determining, by the controller, the distance to the external personal air vehicle based on the size of the emergency sound; and
determining, by the controller, the location of the external personal air vehicle based on the altitude of the external personal air vehicle and the distance to the external personal air vehicle.

17. The control method according to claim 16, further comprising:
operating, by the controller, the transceiver to transmit the location of the external personal air vehicle to the rescue center server.

18. The control method according to claim 10, wherein the personal air vehicle further includes a horn provided on the front surface of the speaker, and the horn extends beyond the radius of the propeller of the propulsion device.

* * * * *